United States Patent [19]

Naito

[11] 4,407,515
[45] Oct. 4, 1983

[54] COMBINED OIL RING

[75] Inventor: Yoshio Naito, Urawa, Japan

[73] Assignee: Nippon Piston Ring Co., Ltd.,, Tokyo, Japan

[21] Appl. No.: 387,312

[22] Filed: Jun. 11, 1982

[30] Foreign Application Priority Data

Jun. 12, 1981 [JP] Japan ................... 56-90506

[51] Int. Cl.$^3$ .................... F16J 9/04; F16L 9/06
[52] U.S. Cl. ................... 277/139; 277/141
[58] Field of Search ............... 277/139, 140, 141, 236, 277/DIG. 6

[56] References Cited

U.S. PATENT DOCUMENTS

| | | | |
|---|---|---|---|
| 3,467,397 | 9/1969 | Sugahara | 277/139 |
| 3,488,060 | 1/1970 | Prasse | 277/141 |
| 3,522,949 | 8/1970 | Wells | 277/140 |
| 3,695,622 | 10/1972 | Davis et al. | 277/139 |

Primary Examiner—Robert I. Smith
Attorney, Agent, or Firm—Sughrue, Rothwell, Mion, Zinn & Macpeak

[57] ABSTRACT

A combined oil ring comprising a steel spacer expander and two steel side rails is described, which has excellent wear resistance and can be used in, for example, an internal combustion engine. The spacer expander and the side rail have specific structures procuded by applying a low temperature gas nitriding treatment.

10 Claims, 1 Drawing Figure

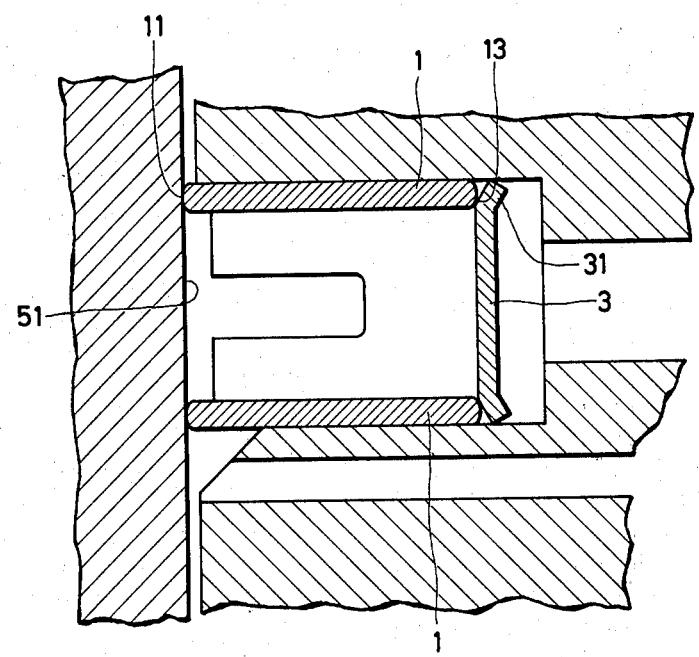

COMBINED OIL RING

BACKGROUND OF THE INVENTION

The present invention relates to an oil ring for use in an internal combustion engine, and more particularly, to a combined oil ring including side rails made of steel and a spacer expander made of steel.

The oil ring of the invention includes, as shown in the FIGURE, two side rails 1, supported by a space expander 3 in the axial and radial directions thereof, in which an outer peripheral surface 11 of the side rail 1 is in sliding contact with an inner peripheral surface 51 of a cylinder, and an inner peripheral surface 13 of the side rail 1 is in contact with a projection 31 of the spacer expander 3.

This type of oil ring is reduced in width by using side rails having a width of 1.0 mm or less and, therefore, it has good flexibility in the radial direction. Thus, the oil ring is improved in follow-up properties with respect to an inner peripheral surface of the cylinder, and has an excellent sealing function. In order to achieve such a reduction in the width of the oil ring, it is inevitably necessary to use steel ribbons.

The use of such steel wires in a piston ring application, however, gives rise to various problems because of their mechanical properties, and it has thus been desired to overcome these problems. The most serious problem is that steel material suffers from a so-called thermal deformation phenomenon under high temperature conditions such as in a diesel engine, and loses its self-tension. Another serious problem is that, under high load conditions such as in a diesel engine, the spacer expander and side rails are seriously worn out and it is thus necessary to increase their wear resistance.

In order to overcome the above-described problems, in particular, to increase the wear resistance, surface coatings exemplified by hard chromium plating and heat treatment exemplified by a low temperature gas nitriding treatment have been conventionally applied (see, for example, Japanese Patent Publication No. 16502/60, Japanese Utility Model Publication No. 241/69 and U.S. Pat. No. 2,390,417.

In accordance with such surface treatments, however, satisfactory results cannot always be obtained, and it is especially necessary to chose the surface treatment depending on the function of the oil ring. Although the outer peripheral surface of the side rails are most required to have good wear resistance because they are in sliding contact with the inner peripheral surface of a cylinder, if the outer peripheral surface is made of a material containing a large amount of high hardness carbide, the spacer expander is worn out by the peripheral surface of the side rail. On the other hand, if the spacer expander is made of high hardness material, press molding of the spacer expander becomes difficult. In the case of the above-described chromium plating, if a chromium-plated oil ring is used in combination with a chromium-plated cylinder, they are worn out by the contact therebetween and, furthermore, corrosive wear occurs in diesel and a high-octane gasoline engines. Thus, chromium plating is limited in application.

An oil ring subjected to a heat treatment such as a low temperature gas nitriding treatment suffers from the disadvantage that the parent material is softened simultaneously with the hardening of the oil ring surface and, therefore, such heat treatments cannot always increase wear resistance to a satisfactory level although they prevent thermal fatigue. Therefore, even when the side rails and spacer expander are subjected to a low temperature gas nitriding treatment, either the side rails or the spacer expander is abnormally worn out, depending on the type of parent material used for the spacer expander and side rails, and it is thus very difficult to obtain the optimum combination.

The side rail and the spacer expander are relatively slidable with each other. Particularly, the side rail must provide specific wear-resistivity, while the spacer expander must provide sufficient mechanical strength capable of withstanding plastic deformation and pressing deformation for its shaping. Therefore, it would be rather difficult to provide optimum combination therebetween for pro ducing combined oil ring.

According to a piston ring described in U.S. Pat. No. 2,390,417, since the piston ring includes low carbon and chromium content (C:0.2 to 0.27 ), effect attendant to chromium carbide may not be obtainable, and therefore, sufficient wear resistivity may not be obtainable.

Cast iron contains high carbon and chromium content as described in Japanese patent publication No. 53-17966/1978. In the cast iron, graphite exists to provide surface lubrication properties. However, graphite does not provide sufficient mechanical strength, and therefore, such may not be applied to the combined oil ring.

SUMMARY OF THE INVENTION

The object of the invention is to provide a combined oil ring comprising a spacer expander and side rails which are both greatly increased in wear resistance and thermal fatigue resistance even under high temperature and high load conditions.

The present invention, therefore, relates to a combined oil ring comprising a spacer expander and side rails which are made of steel and have specific structures prepared by application of a low temperature gas nitriding treatment.

BRIEF DESCRIPTION OF THE DRAWING

The single FIGURE is a cross sectional view of an oil ring of the invention.

DETAILED DESCRIPTION OF THE PREFERRED EMBODIMENTS

The combined oil ring of the invention comprises a spacer expander and side rails having Structure (A) and Structure (B), respectively, as will be described below.

Structure (A)

The matrix structure of the parent material is Austenite. In the surface, there is formed a nitride layer which has a thick ness of at least $2\mu$ and a total hardness of HV 800 to HV 1,000.

Structure (B)

The matrix structure of the parent material is Martensite, in which fine granular carbides having a grain size of $10\mu$ or less and a hardness of HV 1,200 to HV 1,500 are disposed in an area ratio of 3 to 7%. In the surface, there is formed a nitride layer which has a total hardness of HV 900 to HV 1,500 and a thickness of at least $2\mu$, and which contains 0.6 to 1.4% carbon (C) and 12.0 to 19.0% chromium (Cr). In addition, a diffusion layer having a thickness of at least $20\mu$ is formed below the nitride layer.

Although there are a number of factors causing friction and abrasion, hardness, the presence and amount of hard substances, and the structure thereof are mainly responsible therefor.

The spacer expander of the invention is prepared by subjecting a stainless steel having an Austenite matrix structure to a low temperature nitriding treatment at a temperature of from 550° C. to 600° C. High chromium (Cr) content Austenite steel is employed because of its excellent heat resistance and plastic workability. Application of a low temperature nitriding treatment to such Austenite stainless steel results in the formation of a nitride layer in the surface thereof. The total hardness of the surface is from HV 800 to HV 1,000, which is relatively low for a hardened layer of a wear resistant material. Therefore, when the spacer expander of the invention is used in combination with side rails which are plated with chromium on the inner peripheral surface thereof, no significant effect can be obtained, as demonstrated by the experimental results as described hereinafter.

In accordance with the invention, therefore, the spacer expander of Austenite stainless stee is used in combination with side rails of Martensite stainless steel containing 0.6 to 1.4% carbon (C) and 12.0 to 19.0% chromium (Cr), which have been subjected to a low temperature nitriding treatment, to obtain the desired effects. The side rail is usually made of a Martensite steel having a large carbide content because its outer peripheral surface is required to have wear resistance. However, when such Martensitic steel materials are subjected to a low temperature nitriding treatment, the parent material is softened and, therefore, the wear resistance of the resulting steel material is based on the nitride layer alone. Thus, in order to maintain wear resistance over a long period of time, it is necessary to markedly increase the thickness of the nitride layer or to markedly increase the carbide content of the parent material. Increasing the thickness of the nitride layer in such steel materials, however, may produce embrittlement. Furthermore, the ultimate side rail is too hard compared with the spacer expander of Austenic stainless steel, leading to serious abrasion of the spacer expander.

The side rail of the invention is prepared by subjecting a Martensitic steel material to a low temperature nitriding treatment, in which fine carbides are dispersed in an area ratio of from 3 to 7%. The outer peripheral sliding surface of the side rail is provided with a bearing effect resulting from the presence of carbides. At the same time, the wear characteristics of the inner peripheral surface of the side rail against the spacer expander are improved as described hereinafter.

The spacer expander and the side rail are in a contact condition such that abrasion is caused by repeated striking at a fixed point rather than by sliding contact as illustrated in the FIGURE. In engines in which fine combustion residue particles are produced, such as in a diesel engine or a high-octane gasoline engine, it is believed that the fine combustion residue particles abruptly increase the abrasion of the contact surfaces. The abrasion is ascribable mainly to the development of fine cracks in the contact surfaces and the breakage of the contact surfaces following the deveopment of fine cracks. It is believed that the abrasion is affected not only by the hardness of the material but also by the strength of the material.

In the side rail of the invention, since fine carbides having a grain size of 10μ or less are uniformly dispersed in the surface matrix thereof, the formation of cracks developing around the carbides can be prevented. Furthermore, by ajusting the amount of carbide to 7% or less in area ratio, embrittlement can be prevented. On the other hand, the nitride layer exhibits sufficient wear resistance at an initial stage of the operation of an engine driven under severe abrasion condition because its hardness is higher than that of the carbide.

The side rail of the invention has wear characteristics as described hereinafter.

Chromium (Cr) acts as a carbide-forming element. When the chromium content is less than 12%, the amount of carbide formed is small and, furthermore, the amount of carbide solid solution in the matrix is small. Side rails having such low chromium contents, therefore, are poor in wear resistance and hardness. On the other hand, when the chromium content is increased to more than 19%, the amount of carbide solid solution in the matrix is excessively increased, accelerating embrittlement. Thus, the chromium content is adjusted within the range of from 12 to 19%.

Carbon (C) is essential for the formation of carbides and also for the Martensitic transformation of the matrix. If the carbon content is less than 0.60%, carbides are inadequately formed, and the wear resistance of the ultimate side rail is poor. On the other hand, when the carbon content is more than 1.4%, the amount of carbide formed is excessively increased and the matrix is embrittled. Thus, the carbon content is chosen within the range of from 0.60 to 1.4%.

With the side rail of the invention, even after the nitride layer is worn out, the carbide exhibits relatively hight wear resistance. Therefore, in an engine which is operated within a constant abrasion range after an initial abrasion is completed, the side rail of the invention exhibits sufficient wear resistance. This effect is obtained particularly at an outer peripheral surface of a side rail which is placed under severe abrasion conditions. At the inner peripheral surface of the side rails, since the abrasion of the inner peripheral surface is, as described hereinbefore, ascribable mainly to the fatigue caused by repeated striking, the provision of a diffusion layer having a relatively high hardness between the nitride layer and the parent material produces the effect of increasing the fatigue strength. With regard to the hardness of the nitride layer, if the total hardness is more than HV 1,500, the side rail seriously wears the spacer expander, whereas if it is less than HV 900, the outer peripheral surface of the side rail is seriously worn out. Thus, the hardness of the nitride layer is chosen within the range of HV 900 to HV 1,500.

In the production of the side rail of the invention, it is desirable to use, as a first steel material, a Martensite steel containing from 0.60 to 1.20% by weight carbon (C), 1.0% by weight or less silicon (Si), 1.0% by a weight or less manganese (Mn), and from 16.0 to 19.0% by weight chromium (Cr), the balance being iron containing impurities, or, as a second steel material, a steel containing from 0.60 to 0.80% by weight carbon (C), from 12.0 to 14.0% by weight chromium (Cr), 0.4% by weight or less silicon (Si), and from 0.5 to 1.0% by weight manganese (Mn), the balance being ion (Fe) containing impurities.

The first steel offers the effects based on the strength of the matrix and the amount of carbide because of its high carbon (C) and chromium (Cr) contents. When the first steel is used, it is preferred to prevent the softening of the steel associated with the application of the low temperature nitriding treatment by adding thereto from 1.0 to 1.3% by weight molybdenum (Mo) and from 0.07 to 0.12% by weight vanadium (V).

In the case of the second steel material, a reduction in the carbon (C) and chromium (Cr) contents enables easy performance of the low temperature nitriding treatment and, furthermore, an increase in the effects of the treatment. In any event, the hardness is chosen within the range of HV 900 to HV 1,500.

In both side rail and spacer expander, the thickness of the nitride layer is required to be at least $2\mu$ because, if it is less than $2\mu$, the nitride layer is worn away in the initial abrasion stage. The diffusion layer supporting the nitride layer can exhibit its effects only when its thickness is at least $20\mu$ although it varies depending on the thickness of the nitride layer. On the other hand, when the thickness of the nitride layer is more than about $50\mu$, embrittlement seriously occurs although the degree varies depending on the thicknesses of the side rail and the spacer expander. The thickness of nitride layer, therefore, is preferably chosen below $50\mu$.

In accordance with the invention, there can be obtained a combined oil ring having excellent wear resistance, resulting from the combined characteristics of the side rails and the spacer expander.

What is claimed is:

1. An oil ring, comprising; a steel spacer expander and a pair of steel side rails, said steel spacer expander comprising a parent material of Austenite matrix structure and having a nitride layer in the surface the thereof; said steel side rails comprising a parent material of Martensite matrix structure, and having a nitride layer formed in the surface thereof.

2. A device as claimed in claim 1, said nitride layer of said steel spacer expander having a thickness of at least $2\mu$.

3. A device as claimed in claim 1, said surface of said expander having a total hardness of HV 800 to HV 1,000.

4. A device as claimed in claim 1, said steel side rails including fine granular carbides dispersed in an area ratio of 3 to 7%.

5. A device as claimed in claim 4, said carbides having a grain size of $10\mu$ or less and a hardness of HV 1,200 to HV 1,500.

6. A device as claimed in claim 1, said nitride layer formed on said steel rails having a thickness of at least $2\mu$, and the surface thereof having a total hardness of HV 900 to HV 1,500.

7. A device as claimed in claim 1, further including a diffusion layer beneath said nitride layer of said steel rails.

8. A device as claimed in claim 7, said diffusion layer having a thickness of at least $20\mu$.

9. A device as claimed in claim 1, said steel rails containing carbon and chromium in a range of 0.6 to 1.4% and 12 to 19%, respectively.

10. A device as claimed in claim 1, said steel rails containing molybdenum and vanadium in a range of 1 to 1.3% and 0.07 to 0.12%, respectively.

* * * * *